United States Patent
Kleyer et al.

(10) Patent No.: US 6,465,550 B1
(45) Date of Patent: Oct. 15, 2002

(54) SILICONE COMPOSITION AND ELECTRICALLY CONDUCTIVE, CURED SILICONE PRODUCT

(75) Inventors: Don Lee Kleyer, Hemlock, MI (US); Michael Andrew Lutz, Hope, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/633,997

(22) Filed: Aug. 8, 2000

(51) Int. Cl.[7] ............................. C08L 83/04; C08K 3/10
(52) U.S. Cl. .................. 524/268; 252/514; 252/520.3; 524/440; 524/588; 528/16; 528/26; 528/34
(58) Field of Search .............................. 252/514, 520.3; 524/440, 588, 268; 528/26, 13, 34, 16

(56) References Cited

U.S. PATENT DOCUMENTS

| | | | |
|---|---|---|---|
| 3,888,815 A | 6/1975 | Bessmer et al. | 260/37 |
| 3,971,747 A | 7/1976 | Bank et al. | 260/37 |
| 4,370,358 A | 1/1983 | Hayes et al. | 427/54.1 |
| 4,707,531 A | 11/1987 | Shirahata | 528/12 |
| 4,761,454 A | 8/1988 | Oba et al. | 524/862 |
| 5,310,843 A | 5/1994 | Morita | 528/15 |
| 5,371,139 A | 12/1994 | Yokoyama et al. | 524/755 |
| 5,512,605 A | 4/1996 | Eckberg et al. | 522/31 |
| 6,010,646 A * | 1/2000 | Schleifstein | |

FOREIGN PATENT DOCUMENTS

| | | | | |
|---|---|---|---|---|
| JP | 59096122 A | | 6/1984 | C08G/59/18 |
| JP | 3043482 A | | 2/1991 | C09J/163/00 |
| JP | 03-128968 A | * | 5/1991 | |
| JP | 3-128968 A | * | 5/1991 | |
| JP | 03-234778 | * | 10/1991 | |
| JP | 63161014 A | | 7/1998 | C08G/59/18 |
| WO | WO 9002768 A | | 3/1990 | C08G/59/30 |

* cited by examiner

Primary Examiner—Robert Dawson
Assistant Examiner—Marc S. Zimmer
(74) Attorney, Agent, or Firm—Larry A. Milco; Catherine U. Brown

(57) ABSTRACT

A silicone composition for preparing a cured silicone product, the composition prepared by mixing: (A) an organopolysiloxane containing an average of at least two epoxy-functional organic groups per molecules; (B) a curing agent in an amount sufficient to cure the composition, provided the curing agent is free of phenolic hydroxy groups; (C) an electrically conductive filler in an amount sufficient to impart electrical conductivity to the silicone product, wherein the filler comprises particles having at least an outer surface of a metal selected from silver, gold, platinum, palladium, and alloys thereof; and (D) an effective amount of a hydroxy-functional organic compound having a molecular weight up to about 1000 and containing at least one hydroxy group per molecule, provided the compound does not substantially inhibit cure of the composition. A cured silicone product and a multi-part silicone composition.

19 Claims, No Drawings

SILICONE COMPOSITION AND ELECTRICALLY CONDUCTIVE, CURED SILICONE PRODUCT

FIELD OF THE INVENTION

The present invention relates to a silicone composition and more particularly to a silicone composition containing an electrically conductive filler and a hydroxy-functional organic compound. The present invention also relates to an electrically conductive, cured silicone product formed from the silicone composition.

BACKGROUND OF THE INVENTION

Silicone compositions containing an epoxy-functional organopolysiloxane, curing agent, and electrically conductive filler are known in the art. For example, Japanese Patent Application (Kokai) 63-161014 to Akinobu et al. discloses an electrically conductive resin paste consisting of (A) silver powder, (B) an epoxy resin, (C) a hardening agent, and (D) a dimethylsiloxane compound containing epoxy, amino, or alcohol groups.

Japanese Patent Application (Kokai) 30-43482 to Oura et al. discloses a conductive adhesive containing (A) an epoxy-modified silicone compound obtained by reaction of a carboxyl-capped dimethylsiloxane and an epoxy resin having at least 2 epoxy groups per molecule, wherein the dimethylsiloxane has the general formula:

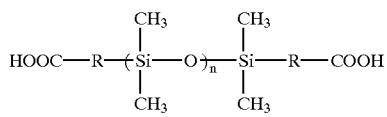

wherein R is a divalent organic group and n is an integer from 1 to 500; (B) a curing agent; and (C) a conductive filler.

WO9002768 to Ohura et al. discloses an electrically conductive adhesive comprising a silicone-epoxy resin having the formula:

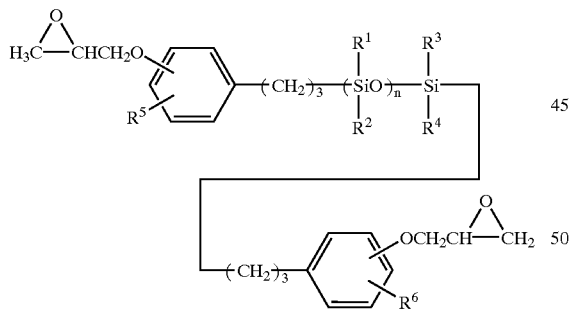

wherein $R^1$, $R^2$, $R^3$, and $R^4$ are selected from alkyl having 1 to 4 carbon atoms, alkenyl having 2 to 4 carbon atoms, and phenyl; $R^5$ and $R^6$ are selected from hydrogen and methoxy; and n is from 1 to 100; a hardening agent; and an electrically conductive filler.

Although the aforementioned silicone compositions cure to form products exhibiting a range of electrical properties, there is a persistent need for silicone products having improved conductivity.

SUMMARY OF THE INVENTION

The present inventors have discovered that a curable silicone composition containing an electrically conductive filler and a hydroxy-functional organic compound cures to form a silicone product having unexpectedly superior electrical conductivity. Specifically, the present invention is directed to a silicone composition for preparing a cured silicone product, the composition prepared by mixing:

(A) an organopolysiloxane containing an average of at least two epoxy-functional organic groups per molecule;

(B) a curing agent in an amount sufficient to cure the composition, provided the curing agent is free of phenolic hydroxy groups;

(C) an electrically conductive filler in an amount sufficient to impart electrical conductivity to the silicone product, wherein the filler comprises particles having at least an outer surface of a metal selected from silver, gold, platinum, palladium, and alloys thereof, and (D) an effective amount of a hydroxy-functional organic compound having a molecular weight up to about 1000 and containing at least one hydroxy group per molecule, provided the compound does not substantially inhibit cure of the composition.

The present invention is also directed to a cured silicone product comprising a reaction product of the above-described composition.

The present invention is further directed to a multi-part silicone composition comprising components (A) through (D) in two or more parts, provided component (A) and component (D) are not present in the same part.

The silicone composition of the present invention has numerous advantages, including good flow, low VOC (volatile organic compound) content, and adjustable cure. Moreover, the present silicone composition cures to form a silicone product having good adhesion and unexpectedly superior electrical conductivity as evidenced by low contact resistance and/or volume resistivity.

The silicone composition of the present invention has numerous uses, including the manufacture of electronic, construction, appliance, and aerospace products. Moreover, the silicone composition of the present invention is useful for preparing an electrically conductive, cured silicone product, such as an electrically conductive coating, adhesive, or gasket.

These and other features, aspects, and advantages of the present invention will become better understood with reference to the following description and appended claims.

DETAILED DESCRIPTION OF THE INVENTION

The present invention is directed to a silicone composition for preparing a cured silicone product, the composition prepared by mixing:

(A) an organopolysiloxane containing an average of at least two epoxy-functional organic groups per molecule;

(B) a curing agent in an amount sufficient to cure the composition, provided the curing agent is free of phenolic hydroxy groups;

(C) an electrically conductive filler in an amount sufficient to impart electrical conductivity to the silicone product, wherein the filler comprises particles having at least an outer surface of a metal selected from silver, gold, platinum, palladium, and alloys thereof; and (D) an effective amount of a hydroxy-functional organic compound having a molecular weight up to about 1000 and containing at least one hydroxy group per molecule, provided the compound does not substantially inhibit cure of the composition.

Component (A) of the present invention also referred to herein as the "polymer," is at least one organopolysiloxane containing an average of at least two epoxy-functional organic groups per molecule. The structure of the organopolysiloxane can be linear, branched, or resinous. The organopolysiloxane can be a homopolymer or a copolymer. The epoxy-functional organic groups typically have from 2 to about 10 carbon atoms and are exemplified by, but not limited to, vinyl, allyl, butenyl, and hexenyl. The epoxy-functional organic groups in the polydiorganosiloxane may be located at terminal, pendant, or both terminal and pendant positions. Examples of epoxy-functional organic groups include, but are not limited to, 2-glycidoxyethyl, 3-glycidoxypropyl, 4-glycidoxybutyl, 2-(3,4-epoxycyclohexyl)ethyl, 3-(3,4-epoxycyclohexyl)propyl, 2,3-epoxypropyl, 3,4-epoxybutyl, and 4,5-epoxypentyl.

The remaining silicon-bonded organic groups in the organopolysiloxane are independently selected from monovalent hydrocarbon and monovalent halogenated hydrocarbon groups. These monovalent groups typically have from 1 to about 20 carbon atoms, preferably from 1 to 10 carbon atoms, and are exemplified by, but not limited to alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups in the organopolysiloxane are methyl.

The viscosity of the organopolysiloxane at 25° C., which varies with molecular weight and structure, is typically from 0.05 to 200 Pa·s, preferably from 0.5 to 100 Pa·s, and more preferably from 2 to 50 Pa·s.

Organopolysiloxanes useful in the silicone composition of the present invention include a linear organopolysiloxane having the general formula $R^2R^1_2SiO(R^1R^2SiO)_m(R^1R^2SiO)_nSiR^1_2R^2$ wherein each $R^1$ is independently selected from monovalent hydrocarbon and monovalent halogenated hydrocarbon groups, as defined and exemplified above; each $R^2$ is independently an epoxy-functional organic group or $R^1$; m is 0 or a positive integer; n is 0 or a positive integer; the sum of m and n is such that the organopolysiloxane has a viscosity of from 0.05 to 200 Pa·s at 25° C.; and the organopolysiloxane contains an average of at least two epoxy-functional organic groups per molecule. Examples of linear organopolysiloxanes include, but are not limited to, organopolysiloxanes having the following formulae: $R^3Me_2SiO(Me_2SiO)_pSiMe_2R^3$, $R^3Me_2SiO(Me_2SiO)_{0.25p}(MePhSiO)_{0.75p}SiMe_2R^3$, $R^3Me_2SiO(Me_2SiO)_{0.95p}(Ph_2SiO)_{0.05p}SiMe_2R^3$, $R^3Me_2SiO(Me_2SiO)_{0.98p}(RmeSiO)_{0.02p}SiMe_2R^3$, and $R^3Me_2SiO(Me_2SiO)_{0.9p}(RmeSiO)_{0.1p}SiMe_2R^3$, wherein $R^3$ is glycidoxypropyl, Me is methyl, Ph is phenyl, and p has a value such that the viscosity of the organopolysiloxane is from 0.05 to 200 Pa·s at 25° C.

Methods of preparing linear organopolysiloxanes suitable for use in the composition of the present invention, such as a hydrosilylation reaction of an aliphatically unsaturated epoxy-containing organic compound and an organohydrogenpolysiloxane in the presence of a platinum catalyst, are well known in the art as exemplified in U.S. Pat. No. 5,512,605 to Eckberg et al. Examples of aliphatically unsaturated epoxy-containing organic compounds include, but are not limited to, vinyl glycidyl ether, allyl glycidyl ether, butenyl glycidyl ether, 1,2-epoxy-4-vinylcyclohexane, 2,3-epoxy-5-vinylnorbornane, 1,2-epoxy-1-methyl-4-isopropyl-cyclohexane, and limonene oxide.

Organopolysiloxanes useful in the silicone composition of the present invention also include an organopolysiloxane resin consisting essentially of $R^4_3SiO_{1/2}$ units, $R^5R^4_2SiO_{1/2}$ units, and $SiO_{4/2}$ units, wherein each $R^4$ is independently selected from a monovalent hydrocarbon group and a monovalent halogenated hydrocarbon group free of aliphatic unsaturation, $R^5$ is an epoxy-containing organic group, and the mole ratio of $R^4_3SiO_{1/2}$ units and $R^5R^4_2SiO_{1/2}$ combined to $SiO_{4/2}$ units is from 0.65 to 1.9. The monovalent groups represented by $R^4$ typically have from 1 to about 20 carbon atoms, preferably have from 1 to about 10 carbon atoms, and are exemplified by, but not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. The epoxy-functional organic groups represented by $R^5$ are as defined and exemplified above for the organopolysiloxane, component (A). Methods of preparing the aforementioned organopolysiloxane resin are well known in the art as exemplified in U.S. Pat. No. 5,310,843 to Morita and U.S. Pat. No. 4,370,358 to Hayes et al. For example, the organopolysiloxane resin can be prepared by reacting an organopolysiloxane resin consisting essentially of $R^4_3SiO_{1/2}$ units, $HR^4_2SiO_{1/2}$ units, and $SiO_{4/2}$ units, wherein $R^4$ is as defined and exemplified above, and the mole ratio of $R^4_3SiO_{1/2}$ units and $HR^4_2SiO_{1/2}$ units combined to $SiO_{4/2}$ units is from 0.65 to 1.9, with an aliphatically unsaturated epoxy-containing organic compound, exemplified above, in the presence of a hydrosilylation catalyst.

Organopolysiloxane resins containing silicon-bonded hydrogen atoms can also be prepared by well-known methods in the art as exemplified in the aforementioned patents by Morita and Hayes et al. and in U.S. Pat. No. 4,707,531 to Shirahata. For example, the resin can be produced by adding a tetraalkoxysilane dropwise to a mixture of a hexaorganodisiloxane and a tetraorganodisiloxane in aqueous hydrochloric acid.

Component (A) can be a single organopolysiloxane or a mixture comprising two or more organopolysiloxanes that differ in at least one of the following properties: structure, viscosity, average molecular weight, siloxane units, and sequence.

Component (B) of the present invention is a curing agent that cures (crosslinks) component (A). The curing agent can be any curing agent typically used to cure epoxy resins, provided the curing agent is free of phenolic hydroxy groups. As used herein, the term "phenolic hydroxy groups" refers to hydroxy groups attached to aromatic carbon atoms. Examples of suitable curing agents include, but are not limited to, anhydrides such as phthalic anhydride, hexahydrophthalic anhydride, tetrahydrophthalic anhydride, and dodecenylsuccinic anhydride; polyamines such as diethylenetriamine, triethylenetetramine, diethylenepropylamine, N-(2-hydroxyethyl)diethylenetriamine, N,N'-di(2-hydroxyethyl)diethylenetriamine, m-phenylenediamine, methylenedianiline, aminoethyl piperazine, 4,4-diaminodiphenyl sulfone, benzyldimethylamine, dicyandiamide, and 2-methylimidazole, and triethylamine; Lewis acids such as boron trifluoride monoethylamine; polycarboxylic acids; polymercaptans; polyamides; and amidoamines. Component (B) can be a single curing agent or a mixture comprising two or more different curing agents.

Anhydrides are preferred curing agents according to the present invention. Because the reactivity of some anhydrides with epoxy groups is very slow, an accelerator, usually a tertiary amine, such as triethylamine or benzyldimethylamine, is commonly used to increase cure rate.

In addition to the curing agents cited above, component (B) can also be a mixture comprising an organosilicon compound containing at least two silicon-bonded hydroxy groups and a certain aluminum compound, such as an aluminum alkoxide, chelate, and acylate. Examples of organosilicon compounds include, but are not limited to, hydroxy-functional silanes, organosiloxanes, and silcarbanes.

Examples of aluminum compounds include, but are not limited to, aluminum alcoholates such as aluminum triethoxide, aluminum triisopropoxide, aluminum tri(sec-butoxide), aluminum tri-3-amyloxide, trioctoxyaluminum, tridodecyloxyaluminum, trihexadecyloxyaluminum, and trioctadecyloxyaluminum, di-isopropoxidecresyl aluminate, tri(o-cresol)aluminate, tri(m-cresyl)aluminate, tri(2,4-xylenyl)aluminate, tri(hexylphenyl)aluminate, tri(nonylphenyl)aluminate, tri(dodecylphenyl)aluminate, and tri(2-naphthyl)aluminate; aluminum acylates such as aluminum triacetate, aluminum tripropionate, aluminum tribenzoate, aluminum tristearate, aluminum tributyrate, aluminum-diacetate-monostearate, and aluminum tri(3-methylbenzoate), aluminum hydroxydistearate, aluminum monoisopropoxide dibenzoate, aluminum hydroxy diacetate, aluminum dihydroxy monobutyrate, and aluminum ethoxide disterarate; condensation products of aluminum acylates such as $(CH_3)(CH_3COO)AlOAl(OOCCH_3)(OCH_3)$; a salt of an aluminum trialkoxide such as $H+Al(OC_3H_7)_3OCH_3^-$, $H+Al(OC_4H_9)_4^-$, and $H+Al(OC_6H_5)(OC_3H_7)_3$; aluminosiloxy compounds such as reaction products of aluminum ethoxide and methyldimethoxysilanol, aluminum isopropoxide and dimethyldiacetoxysilane, aluminum hydroxy distearate and trimethylsilanol, and the aluminum priopionate and 3-chloropropyltriethoxysilane; and aluminum chelates formed by reacting the above aluminum alchoholates, acylates, or salts with nitrogen and sulfur-free sequestering agents containing oxygen as the coordinating atom, such as ethyl acetoacetate, acetylacetone, diethyl malonate, and acetoacetic acid esters of high molecular weight alcohols, such as stearyl alcohol.

Methods of preparing the aforementioned organosilicon and aluminum compounds are well known in the art as exemplified in U.S. Pat. No. 3,971,747 to Bank et al.

The concentration of component (B) in the silicone composition of the present invention is sufficient to cure (crosslink) the composition. The exact amount of component (B) depends on the desired extent and rate of cure, the type of curing agent, and the nature of the other components in the silicone composition. The concentration of component (B) is typically from about 0.5 to about 25 parts by weight and preferably from 0.5 to 10 parts by weight, per 100 parts by weight of the organopolysiloxane, component (A). The optimum concentration of component (B) for a particular application can be readily determined by routine experimentation.

Component (C) of the present invention is at least one electrically conductive filler comprising particles having at least an outer surface of a metal selected from silver, gold, platinum, palladium, and alloys thereof. Fillers comprising particles consisting of silver, gold, platinum, palladium, and alloys thereof typically have the form of a powder or flakes with an average particle size of from 0.5 to 20 $\mu$m. Fillers comprising particles having only an outer surface consisting of silver, gold, platinum, palladium, and alloys thereof typically have an average particle size of from 15 to 100 $\mu$m. The core of such particles can be any material, electrical conductor or insulator, which supports a surface consisting of the aforementioned metal and does not adversely affect the electrical properties of the cured silicone product. Examples of such materials include, but are not limited to, copper, solid glass, hollow glass, mica, nickel, and ceramic fiber.

In the case of electrically conductive fillers comprising metal particles having the form of flakes, the surface of the particles may be coated with a lubricant, such as a fatty acid or fatty acid ester. Such lubricants are typically introduced during the milling of metal powders to form flakes to prevent the powder from cold welding or forming large aggregates. Even when the flakes are washed with a solvent after milling, some lubricant may remain chemisorbed on the surface of the metal.

The electrically conductive filler of the present invention also includes fillers prepared by treating the surfaces of the aforementioned particles with at least one organosilicon compound. Suitable organosilicon compounds include those typically used to treat silica fillers, such as organochlorosilanes, organosiloxane, organodisilazanes, and organoalkoxysilanes.

Component (C) can be a single electrically conductive filler as described above or a mixture of two or more such fillers that differ in at least one of the following properties: composition, surface area, surface treatment, particle size, and particle shape.

Preferably, the electrically conductive filler of the present invention comprises particles consisting of silver and more preferably particles consisting of silver having the form of flakes.

The concentration of component (C) in the silicone composition of the present invention is sufficient to impart electrical conductivity to the silicone product formed by curing the composition. Typically, the concentration of component (C) is such that the cured silicone product has a contact resistance less than about 2 $\Omega$ and a volume resistivity less than about 0.001 $\Omega \cdot$cm, as determined using the methods in the Examples below. The exact concentration of component (C) depends on the desired electrical properties, surface area of the filler, density of the filler, shape of the filler particles, surface treatment of the filler, and nature of the other components in the silicone composition. The concentration of component (C) is typically from about 15 to about 80 percent by volume and preferably from about 20 to about 50 percent by volume, based on the total volume of the silicone composition. When the concentration of component (C) is less than about 15 percent by volume, the cured silicone product typically does not have significant electrical conductivity. When the concentration of component (C) is greater than about 80 percent by volume, the cured silicone product typically does not exhibit further substantial improvement in electrical conductivity.

Methods of preparing electrically conductive fillers suitable for use in the silicone composition of the present invention are well known in the art; many of these fillers are commercially available. For example powders of silver, gold, platinum, or palladium, or alloys thereof are typically produced by chemical precipitation or electrolytic deposition. Also, flakes of the aforementioned metals are typically produced by grinding or milling the metal powder in the presence of a lubricant, such as a fatty acid or fatty acid ester.

Particles having only an outer surface of at least one of the aforementioned metals are typically produced by metallizing an appropriate core material using a method such as electrolytic deposition, electroless deposition, or vacuum deposition.

As stated above, the electrically conductive filler of the present invention can be a filler prepared by treating the surfaces of the aforementioned particles with at least one organosilicon compound. In this case, the particles can be treated prior to admixture with the other ingredients of the silicone composition or the particles can be treated in situ during the preparation of the silicone composition.

Component (D) of the present invention is at least one hydroxy-functional organic compound having a molecular weight up to about 1000 and containing at least one hydroxy group per molecule, provided the compound does not substantially inhibit cure of the composition. When the molecular weight of the hydroxy-functional organic compound is greater than about 1000, the silicone product formed by curing the composition does not have substantially improved electrical conductivity relative to a silicone product formed by curing a similar silicone composition lacking only the hydroxy-functional organic compound. As used herein, the term "substantially inhibit cure" means to prevent cure or retard cure to the point where the cure rate is impracticably slow, for example, several days at about 150° C. Preferably, the silicone composition of the present invention cures in less than about 2 hours at 150° C.

The structure of the hydroxy-functional organic compound can be linear, branched, or cyclic. The hydroxy group(s) in the hydroxy-functional organic compound may be attached to a primary, secondary or tertiary aliphatic carbon atom; an aromatic carbon atom; or a doubly bonded carbon atom in the molecule. Furthermore, there are no restrictions on the stereochemistry of the hydroxy-bearing carbon atom(s) or the molecule.

The hydroxy-functional organic compound can contain one or more functional groups other than hydroxy, provided the compound does not substantially inhibit cure of the composition. Examples of suitable functional groups include, but are not limited to, —O—, >C=O, —CHO, —CO$_2$—, —C≡N, —NO$_2$, >C=C<, and —C≡C—, —F, —Cl, —Br, and —I. The suitability of a particular hydroxy-functional organic compound for use in the silicone composition of the present invention can be readily determined by routine experimentation using the methods in the Examples below.

The hydroxy-functional organic compound can be a naturally occurring or synthetic compound having a liquid or solid state at room temperature. Also, the hydroxy-functional organic compound can be soluble, partially soluble, or insoluble in the silicone composition. The normal boiling point of the hydroxy-functional organic compound, which depends on the molecular weight, structure, and number and nature of functional groups in the compound, can vary over a wide range. Preferably, the hydroxy-functional organic compound has a normal boiling point greater than the cure temperature of the composition. Otherwise, appreciable amounts of the hydroxy-functional organic compound may be removed by volatilization during cure, resulting in little or no enhancement in the conductivity of the cured silicone product. Also, excessive volatilization of the hydroxy-functional organic compound during curing may cause formation of voids in the cured silicone product.

Examples of hydroxy-functional compounds suitable for use in the composition of the present invention include, but are not limited to, monohydric alcohols such as methanol, ethanol, propanol, butanol, pentanol, hexanol, cyclohexanol, hepatanol, nonanol, decanol, undecanol, 1-phenylethanol, benzyl alcohol, allyl alcohol, 3-nitrobenzyl alcohol, 3-chlorobenzyl alcohol, 3-bromobenzyl alcohol, 3-iodobenzyl alcohol, and diethylene glycol butyl ether; dihydric alcohols such as ethylene glycol, propylene glycol (1,2-propanediol), polyethylene glycol, polypropylene glycol, polytetrahydrofuran, benzopinacole, 1,2-butanediol, 1,3-butanediol, 1,4-butanediol, trimethylene glycol (1,3-propanediol), 1,5-pentanediol, 1,6-hexanediol, and bis(2-hydroxyethyl) ether; polyhydric alcohols such as glycerol, pentaerythritol, dipentaerythritiol, tripentaerythritol, trimethylolethane, trimethylolpropane, ditrimethylolpropane, 1,3-dihydroxyacetone dimmer, sorbitol, and mannitol; phenols such as phenol, 1-hydroxynaphthalene, 1,2-dihydroxynaphthalene, hydroquinone, catechol, resorcinol, phloroglucinol (1,3,5-trihydroxybenzene), p-cresol, vitamin E, 2-nitrophenol, 2,4-dinitrophenol, picric acid (2,4,6-trinitrophenol), 4-chlorophenol, 2-bromophenol, 2-iodophenol, 2,4,5-tricholorophenol, chlorohydroquinone, pentachlorophenol; sugars such as glucose, mannose, allose, altrose, idose, gulose, galactose, talose, ribose, arabinose, xylose, lyxose, erythrose, threose, glyceraldehyde, fructose, ribulose, lactose, maltose, and sucrose; hydroxy aldehydes such as 2-hydroxybutyraldehyde, 4-hydroxybenzaldehyde, and 2,4-dihydroxybenzaldehyde; hydroxy ketones such as hydroxyacetone, 1-hydroxy-2-butanone, 2',4'-dihydroxyacetophenone, benzoin, and 3-hydroxy-2-butanone; hydroxy acids such as citric acid, gluconic acid, 3-hydroxybutyric acid, 2-hydroxycinnamic acid, and salicylic acid (2-hydroxybenzoic acid); and hydroxy esters such as ascorbic acid, TWEEN 20 (polyoxyethylene (20) sorbitan monolaurate), methyl salicylate, methyl 3-hydroxybenzoate, and methyl 2-hydroxyisobutyrate.

Component (D) is present in an effective amount in the silicone composition of the present invention. As used herein, the term "effective amount" means that the concentration of component (D) is such that the silicone composition cures to form a silicone product having improved electrical conductivity, initial contact resistance and/or volume resistivity, compared with a similar silicone composition lacking only the hydroxy-functional organic compound. Typically, the concentration of component (D) is such that the cured silicone product exhibits at least about a ten-fold improvement in either contact resistance or volume resistivity, as determined using the methods in the Examples below. The concentration of component (D) is typically from about 0.1 to about 3 percent by weight and preferably from about 0.5 to about 1.5 percent by weight, based on the total weight of the composition. When the concentration of component (D) is less than about 0.1 percent by weight, the cured silicone product typically does not exhibit improved electrical conductivity. When the concentration of component (D) is greater than about 3 percent by weight, the cured silicone product typically does not exhibit further substantial improvement in electrical conductivity. The effective amount of component (D) can be determined by routine experimentation using the methods in the Examples below.

Methods of preparing hydroxy-functional organic compounds suitable for use in the silicone composition of the present invention are well known in the art; many of these compounds are commercially available.

The silicone composition of the present invention can also comprise additional ingredients, provided the ingredient does not prevent curing of the composition to form a product having improved contact resistance and/or volume resistivity compared with a similar silicone composition lacking only the hydroxy-functional organic compound. Examples of additional ingredients include, but are not limited to, adhesion promoters, solvents, and precrosslinked silicone elastomer particulates.

The silicone composition of the present invention can further comprise at least one adhesion promoter that effects strong unprimed adhesion of the silicone composition to substrates commonly employed in the construction of electronic devices; for example, silicon; passivation coatings, such as silicon dioxide and silicon nitride; glass; metals, such as copper and gold; ceramics; and organic resins, such as polyimide. The adhesion promoter can be any adhesion promoter typically employed in curable silicone compositions comprising an epoxy-functional organopolysiloxane, provided it does not adversely affect cure of the composition or the physical properties of the cured silicone product, particularly contact resistance and volume resistivity.

Examples of adhesion promoters suitable for use in the silicone composition of the present invention include, but are not limited to, epoxy-functional alkoxysilanes such as 3-glycidoxypropyltrimethoxysilane, 1,2-epoxy-4-(2-trimethoxysilylethyl)cyclohexane, and 1,2-epoxy-2-methyl-4-(1-methyl-2-trimethoxysilylethyl)cyclohexane; halofunctional alkoxysilanes such as 3-chloropropyltrimethoxysilane; mercapto-functional alkoxysilanes such as 3-mercaptopropyltrimethoxysilane; amino-functional alkoxysilanes such as 3-aminopropyltrimethoxysilane and [3-(2-aminoethyl) aminopropyl]trimethoxysilane; and ureido-functional alkoxysilanes such as 3-ureidopropyltrimethoxysilane.

Methods of preparing the aforementioned silanes are well known in the art, as exemplified in U.S. Pat. No. 3,888,815 to Bessmer et al.

The concentration of the adhesion promoter in the composition of the present invention is sufficient to effect adhesion of the composition to a substrate, such as those cited above. The concentration can vary over a wide range depending on the nature of the adhesion promoter, the type of substrate, and the desired adhesive bond strength. The concentration of the adhesion promoter is generally from 0.01 to about 10 percent by weight, based on the total weight of the composition. However, the optimum concentration of the adhesion promoter can be readily determined by routine experimentation.

The silicone composition of the present invention can further comprise an appropriate quantity of at least one solvent to lower the viscosity of the composition and facilitate the preparation, handling, and application of the composition. Examples of suitable solvents include, but are not limited to, saturated hydrocarbons having from 5 to about 20 carbon atoms; aromatic hydrocarbons such as xylenes; mineral spirits; halohydrocarbons; esters; ketones; silicone fluids such as linear, branched, and cyclic polydimethylsiloxanes; and mixtures of such solvents. The optimum concentration of a particular solvent in the present silicone composition can be readily determined by routine experimentation.

The silicone composition of the present invention can further comprise at least one precrosslinked silicone elastomer particulate. The silicone particulate provides the cured composition with good elasticity, low hardness, and a low permanent compression set. The particulate is a powder of a precrosslinked silicone elastomer consisting of spherical or irregularly shaped particles. The particles typically have an average particle size of from 0.1 to 500 $\mu$m and preferably have an average particle size of from 0.5 to 300 $\mu$m. Several methods of preparing precrosslinked silicone elastomer particulates are known in the art, including spray drying and curing a curable organopolysiloxane composition as disclosed in Japanese Patent Application No. 59-96122; spray drying an aqueous emulsion containing a curable organopolysiloxane composition as disclosed in U.S. Pat. No. 4,761,454; curing an emulsion of a liquid silicone rubber microsuspension as disclosed in U.S. Pat. No. 5,371,139; and pulverizing a precrosslinked silicone elastomer.

The concentration of the precrosslinked silicone elastomer particulate in the silicone composition of the present invention is typically from 10 to 150 parts by weight and is preferably from 15 to 80 parts by weight, per 100 parts by weight of components (A) and (B) combined.

The silicone composition of the present invention can be a one-part composition comprising components (A) through (D) in a single part or, alternatively, a multi-part composition comprising components (A) through (D) in two or more parts, provided components (A) and (B) are not in the same part. For example, a multi-part silicone composition can comprise a first part containing all of component (A), a portion of component (C), all of component (D), and a second part containing the remaining portion of component (C) and all of component (B).

The one-part silicone composition of the instant invention is typically prepared by combining components (A) through (D) and any optional ingredients in the stated proportions at ambient temperature with or without the aid of a solvent, which is described above. The order of addition of the various components is not critical if the silicone composition is to be used immediately. Also, the multi-part silicone composition of the present invention can be prepared by combining the particular components designated for each part. Mixing can be accomplished by any of the techniques known in the art such as milling, blending, and stirring, either in a batch or continuous process. The particular device is determined by the viscosity of the components and the viscosity of the final silicone composition.

The silicone composition of the present invention can be applied to a wide variety of solid substrates including, but are not limited to, metals such as aluminum, gold, silver, copper, and iron, and their alloys; silicon; fluorocarbon polymers such as polytetrafluoroethylene and polyvinylfluoride; polyamides such as Nylon; polyimides; polyesters; ceramics; and glass. Furthermore, the silicone composition of the instant invention can be applied to a substrate by any suitable means such as spraying, syringe dispensing, screen or stencil printing, or ink jet printing.

A cured silicone product according to the present invention comprises a reaction product of the silicone composition containing components (A) through (D), described above. The silicone composition of this invention can be cured at room temperature or by heating at temperatures up to about 200° C., preferably from about 80 to about 180° C., and more preferably from about 100 to about 150° C., for a suitable length of time. For example, the present silicone composition can be cured in less than about 24 hours at 15020 C.

The silicone composition of the present invention has numerous advantages, including good flow, low VOC (volatile organic compound) content, and adjustable cure. Moreover, the present silicone composition cures to form a silicone product having good adhesion and unexpectedly superior electrical properties.

With regard to flow, the present silicone composition possesses the rheological properties required for a number of applications and is easily dispensed and applied using standard equipment.

Furthermore, absent optional solvent, the silicone composition of the present invention has a very low VOC content. Consequently, the composition avoids the health, safety, and environmental hazards associated with solvent-borne silicone compositions. In addition, the solventless composition of the present invention typically undergoes less shrinkage during curing than solvent-borne silicone compositions.

The silicone composition of the present invention cures rapidly at moderately elevated temperatures. Moreover, the cure rate of the silicone composition can be conveniently adjusted by regulating the type and concentration of the curing agent and the cure temperature.

Further, the silicone composition of the present invention cures to form a silicone product having good adhesion to a wide variety of materials, including metals, glass, silicon, silicon dioxide, ceramics, polyesters, and polyimides.

Importantly, the silicone composition of the present invention cures to form a silicone product having unexpectedly improved electrical conductivity, as evidenced by a low initial contact resistance and/or volume resistivity, compared with a similar silicone composition lacking only the hydroxy-functional organic compound.

The silicone composition of the present invention has numerous uses, including the manufacture of electronic, construction, appliance, and aerospace products. Moreover, the silicone composition of the present invention is useful for preparing an electrically conductive, cured silicone product, such as an electrically conductive coating, adhesive, or gasket.

EXAMPLES

The following examples are presented to further illustrate the silicone composition of this invention, but are not to be considered as limiting the invention, which is delineated in the appended claims. Unless otherwise noted, all parts and percentages reported in the examples are by weight. The following methods and materials were employed in the examples:

The Contact resistance of a cured silicone product on copper was determined using a Keithley Instruments Model 580 Micro-ohm Meter equipped with a 4-pole probe having spring-loaded, gold-plated, chisel point tips. A contact resistance joint was prepared by bonding two rectangular copper bars (0.254 cm×0.254 cm×2.032 cm) with the silicone composition according to the following procedure: One face (rectangular) of each copper bar was cleaned by sanding with 400 grit silicon carbide waterproof sandpaper, scrubbing with a Kimwipe dampened with heptane followed by a Kimwipe dampened with isopropanol, and air drying at room temperature for at least one hour. A small aliquot of the silicone composition was applied at approximately the center (lengthwise) of one bar. A second bar was then oriented perpendicular to the first bar with the center (lengthwise) of each bar facing the other and the silicone composition forming a bondline of 0.025 cm. Finally, the cross-shaped (+) fixture was cured in a forced air oven at 150° C. for twenty-four hours. After allowing the sample to cool to room temperature, the initial contact resistance of the joint was measured. The reported values for contact resistance, expressed in units of ohms, represent the average of three measurements, each performed on identically prepared test specimens.

The volume resistivity of a cured silicone product was determined using a Keithley Instruments Model 580 Micro-ohm Meter equipped with a four-point probe having spring-loaded, gold-plated, spherical tips. A test specimen was prepared by first placing two strips of 3M Scotch brand tape 0.25 cm apart on a glass microscope slide to form a channel extending the length of the slide. An aliquot of the silicone composition was deposited at one end of the slide and over the channel. The composition was then spread over the entire channel by drawing a razor blade through the composition and across the surface at an angle of 45°. The tape strips were removed and the specimen was cured in a forced air oven at 150° C. for twenty-four hours. After allowing the sample to cool to room temperature, the voltage drop between the two inner probe tips was measured at an appropriate current to give a resistance value in ohms. The initial volume resistivity of the cured silicone product was then calculated using the following equation:

$$V = R(W \times T/L)$$

where V is volume resistivity in ohm-centimeters, R is resistance (ohms) of the cured silicone product measured between two inner probe tips spaced 2.54 cm apart, W is the width of the silicone layer in centimeters, T is the thickness of the silicone layer in centimeters, and L is the length of the silicone layer between the inner probes in centimeters (2.54 cm). The thickness of the silicone layer, typically about 0.004 cm, was determined using an Ames Model LG3500-0-04 thickness gauge. The reported values for volume resistivity, expressed in units of ohm-centimeters, represent the average of three measurements, each performed on an identically prepared test specimen.

Polymer: a copolymer having the formula $Rme_2SiO(Me_2SiO)_s(RmeSiO)_tSiMe_2R$, wherein R is glycidoxypropyl, s is about 270, t is about 28, and the polymer has a viscosity of about 2200 mm$^2$/s at 25° C.

Adhesion Promoter: 3-glycidoxypropyltrimethoxysilane.

Curing Agent: dodecenylsuccinic anhydride.

Cure Accelerator: benzyldimethylamine.

Filler: a silver flake sold under the name SF-22 by Degussa Corporation. The filler has a tap density of 3.5 g/cm$^3$; a surface area of 1.07 m$^2$/g; weight loss of 0.05% at 110° C.; weight loss of 0.45% at 538° C.; and a particle size distribution of 9.7 µm (95%), 7.5 µm (90%), 3.0 µm (50%), and 1.0 µm (10%).

TERGITOL TMN-6: a nonionic surfactant commercially available from Union Carbide Corporation. The surfactant consists of 87% of 2,6,8-trimethyl-4-nonyloxypoly-ethyleneoxyethanol (reaction product of 2,6,8-trimethyl-4-nonanol and ethylene oxide), 10% of water, 2% of polyethylene glycol, and 1% of 2,6,8-trimethyl-4-nonanol.

Comparative Example 1

A silicone composition was prepared by first mixing 12.67 parts of Polymer, 1.00 part of Adhesion Promoter, 6.25 parts of Curing Agent, 0.22 part of Cure Accelerator, and 79.86 parts of Filler in a 1 oz. plastic cup. The components were then mixed for 26 seconds using an AM 501 Hauschild dental mixer. The mixture was cooled to room temperature over a period of approximately 5 minutes by immersing the cup in a water bath and the aforementioned mixing and cooling procedure was repeated. The contact resistance and volume resistivity of the cured silicone product are shown in Table 1.

Examples 1–4

In each of Examples 1–4, a silicone composition was prepared by combining the conductivity enhancing agent specified in Table 1 with a sample of the silicone composition prepared in Example 1, according to the following procedure: In a ¼ oz. plastic cup, 0.04 part (1% w/w) of the conductivity enhancing agent was added to 4.00 parts of the silicone composition in Example 1. The components were mixed for 26 seconds using an AM 501 Hauschild dental mixer. The mixture was then cooled to room temperature and the aforementioned mixing and cooling procedure was repeated. The contact resistance and volume resistivity values of the cured silicone products are shown in Table 1.

TABLE 1

| Example | Hydroxy-functional Organic Compound | Contact Resistance ($\Omega$) | Volume Resistivity ($\Omega$.cm) |
|---|---|---|---|
| Comp. 1 | — | $6.63 \times 10^1$ | $1.10 \times 10^{-4}$ |
| 1 | Glycerol | $4.46 \times 10^{-2}$ | $7.20 \times 10^{-5}$ |
| 2 | TERGITOL TMN-6 | $1.62 \times 10^1$ | $4.56 \times 10^{-5}$ |
| 3 | Vitamin E | $2.01 \times 10^2$ | $7.81 \times 10^{-5}$ |
| 4 | 1,3-Dihydroxyacetone dimer | $5.15 \times 10^{-2}$ | $8.55 \times 10^{-5}$ |

That which is claimed is:

1. A multi-part silicone composition for preparing a cured silicone product, the composition prepared by mixing:
   A) an organopolysiloxane containing an average of at least two epoxy-functional organic groups per molecule;
   (B) a curing agent in an amount sufficient to cure the composition, provided the curing agent is free of phenolic hydroxy groups and component (A) and component (B) are not present in the same part;
   (C) an electrically conductive filler in an amount sufficient to impart electrical conductivity to the silicone product, wherein the filler comprises particles having at least an outer surface of a metal selected from silver, gold, platinum, palladium, and alloys thereof; and
   (D) an effective amount of a hydroxy-functional organic compound having a molecular weight up to about 1000 and containing at least one hydroxy group per molecule, provided the compound does not substantially inhibit cure of the composition.

2. The silicone composition according to claim 1, wherein the filler comprises particles consisting of silver, gold, platinum, palladium, or alloys thereof.

3. The silicone composition according to claim 2, wherein the particles consist of silver.

4. The silicone composition according to claim 1, wherein the filler has a concentration from about 20 to about 50 percent by volume, based on the total volume of the composition.

5. The silicone composition according to claim 1, wherein the composition cures at a temperature of from about room temperature to about 150° C.

6. The silicone composition according to claim 5, wherein the hydroxy-functional organic compound has a normal boiling point greater than the cure temperature of the composition.

7. The silicone composition according to claim 1, wherein the hydroxy-functional organic compound is selected from at least one monohydric alcohol, at least one dihydric alcohol, at least one polyhydric alcohol, at least one phenol, at least one sugar, at least one hydroxy aldehyde, at least one hydroxy ketone, at least one hydroxy acid, at least one hydroxy ester, and a mixture comprising at least two of the aforementioned compounds.

8. The silicone composition according to claim 7, wherein the hydroxy-functional organic compound is selected from at least one monohydric alcohol, at least one dihydric alcohol, at least one polyhydric alcohol, and a mixture comprising at least two of the aforementioned compounds.

9. The silicone composition according to claim 5, further comprising a solvent having a normal boiling point greater than the cure temperature of the composition.

10. A cured silicone product comprising a reaction product of the composition of claim 3.

11. The composition of claim 1, further comprising an accelerator.

12. The composition of claim 11, wherein the accelerator comprises a tertiary amine.

13. A cured silicone product comprising a reaction product of the composition of claim 1.

14. The silicone composition according to claim 1, wherein the concentration of component (D) is from 0.5 to 1.5 percent by weight, based on the total weight of the composition.

15. A silicone composition prepared by mixing:
   (A) an organopolysiloxane containing an average of at least two epoxy-functional organic groups per molecule;
   (B) a curing agent in an amount sufficient to cure the composition, wherein the curing agent is free of phenolic hydroxy groups;
   (C) an electrically conductive filler in an amount sufficient to impart electrical conductivity to the silicone product, wherein the filler comprises particles having at least an outer surface of a metal selected from silver, gold, platinum, palladium, and alloys thereof;
   (D) an effective amount of a hydroxy-functional organic compound having a molecular weight up to about 1000 and containing at least one hydroxy group per molecule, provided the compound does not substantially inhibit cure of the composition; and
   (E) an adhesion promoter.

16. The silicone composition according to claim 15, wherein the adhesion promoter is selected from at least one amino-functional alkoxysilane, at least one epoxy-functional alkoxysilane, at least one halo-functional alkoxysilane, at least one mercapto-functional alkoxysilane, at least one amino-functional alkoxysilane, and at least one ureido-functional alkoxysilane.

17. A silicone composition prepared by mixing:
   (A) an organopolysiloxane containing an average of at least two epoxy-functional organic groups per molecule;
   (B) a curing agent in an amount sufficient to cure the composition, wherein the curing agent is free of phenolic hydroxy groups, wherein the curing agent is an anhydride;
   (C) an electrically conductive filler in an amount sufficient to impart electrical conductivity to the silicone product, wherein the filler comprises particles having at least an outer surface of a metal selected from silver, gold, platinum, palladium, and alloys thereof; and
   (D) an effective amount of a hydroxy-functional organic compound having a molecular weight up to about 1000 and containing at least one hydroxy group per molecule, provided the compound does not substantially inhibit cure of the composition.

18. A silicone composition comprising:
   (A) an organopolysiloxane containing an average of at least two epoxy-functional organic groups per molecule;

(B) a curing agent in an amount sufficient to cure the composition, wherein the curing agent is free of phenolic hydroxy groups;

(C) an electrically conductive filler in an amount sufficient to impart electrical conductivity to the silicone product, wherein the filler comprises particles having at least an outer surface of a metal selected from silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition; and (E) a precrosslinked silicone elastomer particulate.

19. A silicone composition prepared by mixing:

(A) an organopolysiloxane containing an average of at least two epoxy-functional organic groups per molecule, wherein the organopolysiloxane is a resin consisting essentially of $R^4_3SiO_{1/2}$ units, $R^5R^4_2SiO_{1/2}$ units, and $SiO_{4/2}$ units, wherein each $R^4$ is independently selected from a monovalent hydrocarbon group and a monovalent halogenated hydrocarbon group free of aliphatic unsaturation, $R^5$ is an epoxy-containing organic group, and the mole ratio of $R^4_3SiO_{1/2}$ units and $R^5R^4_2SiO_{1/2}$ combined to $SiO_{4/2}$ units is from 0.65 to 1.9;

(B) a curing agent in an amount sufficient to cure the composition, wherein the curing agent is free of phenolic hydroxy groups;

(C) an electrically conductive filler in an amount sufficient to impart electrical conductivity to the silicone product, wherein the filler comprises particles having at least an outer surface of a metal selected from silver, gold, platinum, palladium, and alloys thereof; and (D) an effective amount of a hydroxy-functional organic compound having a molecular weight up to about 1000 and containing at least one hydroxy group per molecule, provided the compound does not substantially inhibit cure of the composition.

* * * * *